United States Patent
Chalmers

(10) Patent No.: US 10,390,475 B1
(45) Date of Patent: Aug. 27, 2019

(54) VEHICLE LIGHT GUARD

(71) Applicant: Steven Chalmers, Castle Rock, CO (US)

(72) Inventor: Steven Chalmers, Castle Rock, CO (US)

( * ) Notice: Subject to any disclaimer, the term of this patent is extended or adjusted under 35 U.S.C. 154(b) by 0 days.

(21) Appl. No.: 16/132,398

(22) Filed: Sep. 15, 2018

Related U.S. Application Data

(60) Provisional application No. 62/560,113, filed on Sep. 18, 2017.

(51) Int. Cl.
| | | |
|---|---|---|
| *A01B 76/00* | (2006.01) | |
| *B60Q 1/00* | (2006.01) | |
| *F21S 45/10* | (2018.01) | |
| *F21V 15/04* | (2006.01) | |
| *F21W 107/10* | (2018.01) | |

(52) U.S. Cl.
CPC ............ *A01B 76/00* (2013.01); *B60Q 1/0005* (2013.01); *F21S 45/10* (2018.01); *F21V 15/04* (2013.01); *B60Q 2200/00* (2013.01); *F21W 2107/10* (2018.01)

(58) Field of Classification Search
CPC ....... A01B 76/00; F21V 15/04; B60Q 1/0005; B60Q 2200/00; F21S 45/10; F21W 2107/10
See application file for complete search history.

(56) References Cited

U.S. PATENT DOCUMENTS

| | | | | |
|---|---|---|---|---|
| 6,863,425 | B2 * | 3/2005 | Hatfield, Jr. | ............... B62J 6/02 362/368 |
| 2003/0161156 | A1 * | 8/2003 | Felty | .................... B60Q 1/0483 362/368 |

FOREIGN PATENT DOCUMENTS

GB          867069 A  *  5/1961 ................ F21V 9/08

* cited by examiner

*Primary Examiner* — Donald L Raleigh
(74) *Attorney, Agent, or Firm* — Edwin H. Crabtree; Ramon L. Pizarro

(57) ABSTRACT

A vehicle light guard for protecting from damage an exposed vehicle light mounted on a fender of a tractor or on a fender of a similar type of vehicle. The light guard includes a tubular-shaped housing. The housing is adapted for receipt around the tractor light. The housing has sufficient width and diameter to cover the tractor light. The housing includes a light cord slit opening and a housing post hole adapted for receiving a threaded post attached to the tractor light and an electrical cord connected to a tractor battery. The post hole is center on a bottom portion of the housing. The threaded post and electrical cord are attached to a bottom of the vehicle light. The light cord slit opening and the housing post hole eliminate the need to disconnect the threaded post from the electrical cord, when attaching the tubular-shaped housing around the tractor light.

18 Claims, 2 Drawing Sheets

VEHICLE LIGHT GUARD

This non-provisional utility patent application claims the benefit of the subject matter found in a provisional patent application, Ser. No. 62/560,113, title: "VEHICLE LIGHT GUARD", by the subject inventor, and claims a benefit of a filing date of Sep. 18, 2017.

BACKGROUND OF THE INVENTION (a) Field of the Invention

This invention relates to a vehicle light guard, and more particularly, but not by way of limitation, to a light guard mounted on a fender of a tractor or mounted on a fender of a similar vehicle. The light guard is designed to prevent damage to an exposed vehicle light from tree branches, low hanging objects, and other object that might contact the vehicle light.

(b) Discussion of Prior Art

In U.S. Pat. No. 4,671,552 to Anderson, U.S. Pat. No. 7,246,832 to Cobble et al. and D390,821 to Thorne et al. two different types of vehicle grille guards and a taillight guard are disclosed. These guards are not similar in design when compared to the subject light fixture guard nor do they provide the objects and advantages of the subject invention as described herein.

SUMMARY OF THE INVENTION

In view of the foregoing, it is a primary objective of the subject invention to provide protection for damaging an exposed vehicle light mounted on a fender of a tractor or on a fender of a similar type of vehicle.

Another object is the light guard can be easily mounted on the tractor fender without having to disconnect electrical wiring from a vehicle battery to the tractor light.

Yet another object of the invention is the vehicle light guard can be used not only to protect tractor lights but it can be used to protect various light assemblies mounted on vehicles, which are exposed to tree branches, low hanging objects and other objects that might contact a vehicle light.

The vehicle light guard includes a tubular-shaped housing adapted for receipt around an annular or angular shaped, tractor light. The housing has sufficient width to cover the tractor light. Also, the housing has a diameter greater than a diameter of the tractor light for receiving the light therein.

The housing includes a light cord opening and a housing post hole adapted for receiving a threaded post attached to the tractor light and an electrical cord connected to a tractor battery. The post hole is center on a portion of the housing. The threaded post and electrical cord are attached to a bottom of the light. The light cord opening and the housing post hole eliminate the need to disconnect the threaded post from the electrical cord, when attaching the tubular-shaped housing around the tractor light.

These and other objects of the present invention will become apparent to those familiar with different types of light guards when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject vehicle light guard, and in which.

DESCRIPTION OF THE PREFERRED EMBODIMENTS

Figure 1:
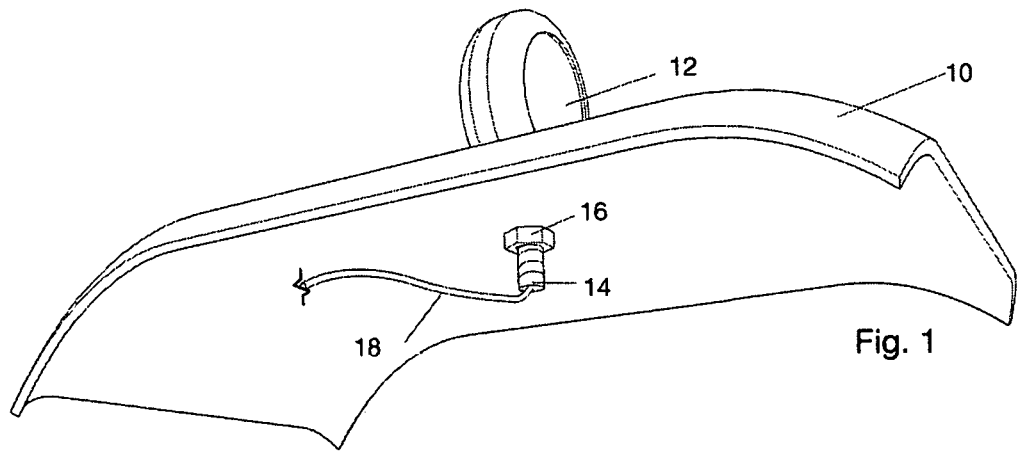
FIG. 1 is a perspective view of an underside of a tractor fender with tractor light mounted on top of the fender.

In FIG. 1, a perspective view of an underside of a tractor fender 10 is shown with an exposed tractor light 12 mounted on top of the fender. The tractor light, while shown annular in shape in the drawings can also have an angular shape with different geometric shapes.

The tractor light 12 includes a threaded post 14 and nut 16 for securing the light to the fender. The tractor light 12 also includes an electric cord 18 for supplying power from a vehicle battery to the light. The battery is not shown in the drawings.

Figure 2:
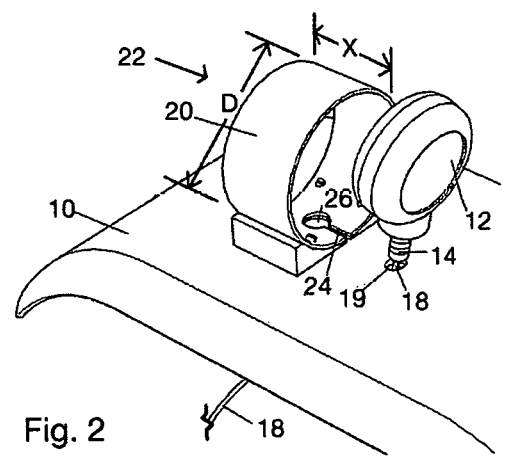
FIG. 2 is a perspective view of the tractor light unscrewed from the fender and positioned for receipt inside a tubular-shaped housing of the light guard.

In FIG. 2, a perspective view of the tractor light 12 is shown unscrewed from the fender 10, by removing the nut 16 from the threaded post 14 and removing the post from a fender hole 19. The light 12 is now positioned for receipt inside a tubular-shaped housing 20 of the subject light guard. The light guard is shown having general reference numeral 22. The light guard 22 can be made of metal or plastic and typically has a width "X" in a range of 3 to 4 inches and a diameter "D" in a range of 6 to 8 inches. These ranges are sufficient to cover and protect the tractor light 12.

In this drawing, a light cord, elongated, slit opening 24 is shown in a bottom of the housing 20. The slit opening 24 extends from one side of the housing to a housing post hole 26. The post hole 26 is centered in the bottom of the housing.

Figure 3:
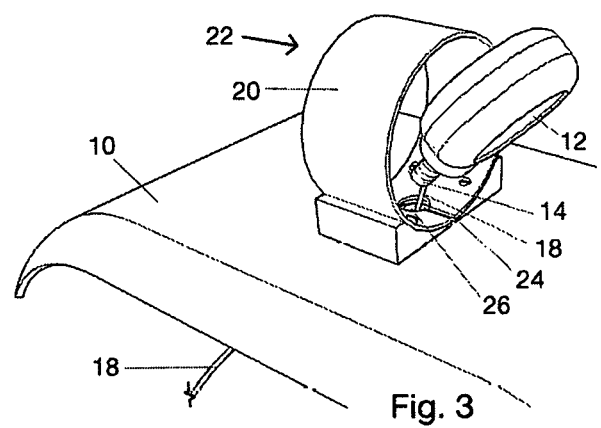
FIG. 3 is another perspective view of the tractor light with electrical cord received through a housing opening in a bottom of the tubular-shaped housing.

In FIG. 3, another perspective view of the tractor light 12 with the electrical cord 18 is shown with the light cord positioned for threading through the slit opening 24 and into the post hole 26 in a bottom of the tubular-shaped housing 20.

Figure 4:
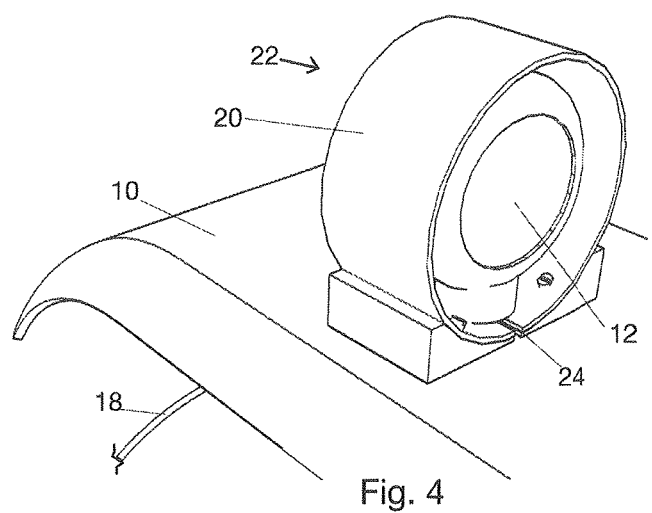
FIG. 4 is still another perspective view of the tractor light installed inside the tubular-shaped housing.

In FIG. 4, still another perspective view of the tractor light 12 is shown installed inside the tubular-shaped housing 20. At this time, the nut 16 is reattached to the threaded post 14 and the tractor light 12 is again secured to the top of the fender 10, as shown in FIG. 1.

Figure 5:
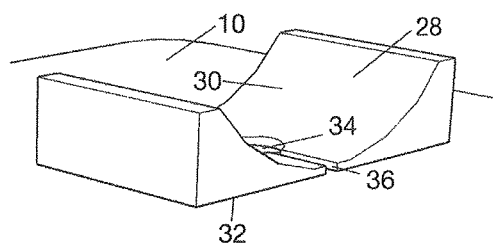
FIG. 5 is a perspective view of the semi-circular rubber base which is received on top of the fender and next to the bottom of the tubular-shaped housing.

In FIG. 5, a perspective view of a semi-circular, light guard, rubber base 28 is illustrated. The base includes a concave top portion 30, which receives a bottom portion of the tubular-shaped housing 20 thereon. The base 28 includes a flat bottom portion 32, which is received on top of a portion of the fender 10. The base 28 includes a base hole 34 and a base electrical cord slit opening 36 for receiving the threaded post 14 and electrical cord 18 therethrough. The base 28 is designed to hold the subject light guard 22 securely on top of the fender and prevent vibration of the tractor light 12 on the fender.

Figure 6:
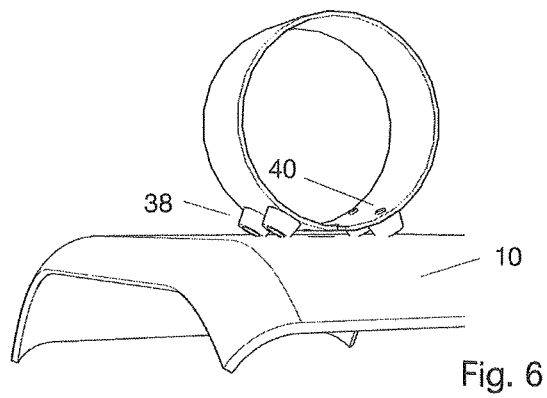
FIG. 6 is another perspective view of the tubular-shaped housing having rubber bumpers mounted on the bottom of the housing.

In FIG. 6, another perspective view of the tubular-shaped housing 20 is shown. In this drawing, the housing is shown mounted on top of the fender 10 and having rubber bumpers 38 attached to a lower portion 40 of the housing. The rubber bumpers 38, similar to the rubber base 28, are used to prevent vibration of the tractor light 12 on the fender 10. Also, various vibration damping means can be used equally well and attached to the bottom of the tubular-shaped housing.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The invention claimed is:

1. A vehicle light guard for protecting from damage an exposed vehicle light, the vehicle light including a threaded post and an electrical cord, the vehicle light mounted on a fender of a tractor or on a fender of a similar type of vehicle, the light guard comprising:
    a tubular-shaped housing, the housing is adapted for receipt around the tractor light;
    a light cord slit opening in a bottom portion of the housing, the electrical cord adapted for receipt through the slit opening; and
    a housing post hole in the bottom portion of the housing, the slit opening extending from a side of the housing to the post hole, the post hole adapted for receiving the threaded post and the electrical cord therethrough.

2. The light guard as described in claim 1 wherein the post hole is centered on a portion of the housing.

3. The light guard as described in claim 1 further including vibration damping means for engaging a bottom portion of the tubular-shaped housing, the vibration damping means for preventing vibration between the housing and the fender.

4. The light guard as described in claim 1 further including a light guard base, the base, the base having a top portion for engaging a bottom portion of the tubular-shaped housing, the base including a bottom portion adapted for receipt on top of a portion of the fender.

5. The light guard as described in claim 4 further including a base hole and a base electrical cord slit opening in the base, the base hole and cord slit opening adapted for receiving the threaded post and electrical cord therethrough, the base adapted for holding the tubular-shaped housing securely on top of the fender to prevent vibration of the tractor light on the fender.

6. The light guard as described in claim 1 further including rubber bumpers attached to a bottom portion of the tubular-shaped housing for holding the housing securely on top of the fender to prevent vibration of the tractor light on the fender.

7. A vehicle light guard for protecting from damage an exposed vehicle light, the light including a threaded post and an electrical cord, the vehicle light mounted on a fender of a tractor or on a fender of a similar type of vehicle, the light guard comprising:
    an annular or angular shaped housing, the housing is adapted for receipt around the tractor light, the housing having a width and a diameter sufficient to cover the vehicle light;
    a light cord slit opening in a bottom portion of the housing, the slit opening adapted for receiving the electrical cord therethrough; and
    a housing post hole adapted for receiving the threaded post therethrough, the post hole centered in the bottom portion of the housing, the slit opening extending from a side of the bottom portion of the housing to the post hole.

8. The light guard as described in claim 7 further including vibration damping means for engaging a bottom portion of the tubular-shaped housing, the vibration damping means for preventing vibration between the housing and the fender.

9. The light guard as described in claim 7 further including a semi-circular rubber base, the base having a concave top portion for engaging the bottom portion of the tubular-shaped housing, the base including a bottom portion adapted for receipt on top of a portion of the fender.

10. The light guard as described in claim 9 further including a base hole and a base electrical cord slit opening in the base, the base hole and cord slit adapted for receiving the threaded post and electrical cord therethrough, the base adapted for holding the light guard securely on top of the fender to prevent vibration of the tractor light on the fender.

11. The light guard as described in claim 7 further including rubber bumpers attached to a bottom portion of the tubular-shaped housing for holding the housing securely on top of the fender to prevent vibration of the tractor light on the fender.

12. The light guard as described in claim 7 wherein the annular or angular shaped housing has a width in a range of 3 to 4 inches.

13. The light guard as described in claim 7 wherein the annular or angular shaped shaped housing has a diameter in a range of 6 to 8 inches.

14. A vehicle light guard for protecting from damage an exposed, annular or angular shaped, vehicle light, the vehicle light including a threaded post and an electrical cord, the vehicle light mounted on a fender of a tractor or on a fender of a similar type of vehicle, the light guard comprising:
    an annular or angular shaped housing, the housing is adapted for receipt around the tractor light, the housing having a width in a range of 3 to 4 inches and a diameter in a range of 6 to 8 inches, the width and diameter of the housing sufficient to cover the vehicle light;
    a light cord slit opening in a bottom portion of the housing, the slit opening adapted for receiving the electrical cord therethrough; and
    a housing post hole adapted for receiving the threaded post therethrough, the post hole centered in the bottom portion of the housing, the slit opening extending from a side of the bottom portion of the housing to the post hole.

15. The light guard as described in claim 14 further including vibration damping means for engaging a bottom portion of the tubular-shaped housing, the vibration damping means for preventing vibration between the housing and the fender.

16. The light guard as described in claim 14 further including a semi-circular rubber base, the base having a concave top portion for engaging the bottom portion of the tubular-shaped housing, the base including a bottom portion adapted for receipt on top of a portion of the fender.

17. The light guard as described in claim 16 further including a base hole and a base electrical cord slit opening in the base, the base hole and cord slit adapted for receiving the threaded post and electrical cord therethrough, the base adapted for holding the light guard securely on top of the fender to prevent vibration of the tractor light on the fender.

18. The light guard as described in claim 14 further including rubber bumpers attached to a bottom portion of the tubular-shaped housing for holding the housing securely on top of the fender to prevent vibration of the tractor light on the fender.

\* \* \* \* \*